United States Patent [19]

Mori

[11] Patent Number: 4,963,775
[45] Date of Patent: Oct. 16, 1990

[54] STEPPING MOTOR
[75] Inventor: Hidetoshi Mori, Tokyo, Japan
[73] Assignee: Tamagawa Seiki Kabushiki Kaisha, Tokyo, Japan
[21] Appl. No.: 332,298
[22] Filed: Mar. 31, 1989
[30] Foreign Application Priority Data Dec. 1, 1988 [JP] Japan .................................. 63-302181

[51] Int. Cl.⁵ ............................................. H02K 37/00
[52] U.S. Cl. ................................... 310/49 R; 310/181; 310/254
[58] Field of Search ................. 310/12, 15, 49 R, 181, 310/254

[56] References Cited

U.S. PATENT DOCUMENTS 3,757,150  9/1973  Bénezéch ............................. 310/181
4,712,028  12/1987  Horber ............................. 310/49 R

FOREIGN PATENT DOCUMENTS 0295858  12/1986  Japan ..................................... 310/12
1415352  8/1988  U.S.S.R. ............................ 310/49 R

OTHER PUBLICATIONS

A. P. Russell and I. E. D. Pickup, "Calculation of the Pull-Out Torque of Hybrid Stepping Motors in the Half-Step Mode", *Electric Machines and Electromechanics*, 7:103-114, (1982)—pp. 103-106.

Primary Examiner—Steven L. Stephan
Assistant Examiner—Judson H. Jones
Attorney, Agent, or Firm—Brooks Haidt Haffner & Delahunty

[57] ABSTRACT

A stepping motor includes stator coils on a stator sandwiched between a pair of covers, and a rotor shaft mounted for rotation on these covers and carrying a rotor composed of rotor yokes and rotor magnets. The rotor is rotated stepwise through a predetermined angle by drive signals supplied to the stator coils. The stator has stator magnets provided at an axially central position for cooperation with the rotor magnets, and the magnetic flux density in the gap between the stator and the rotor is increased by the stator magnets.

8 Claims, 3 Drawing Sheets

FIG. 6
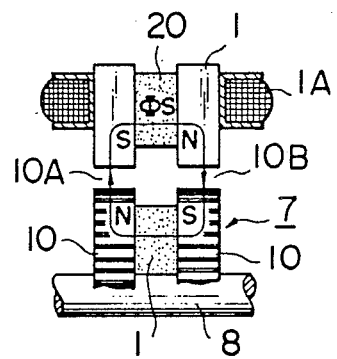
FIG. 7  FIG. 8  FIG. 9
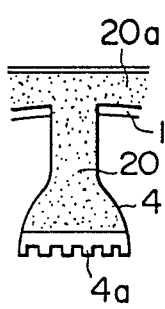 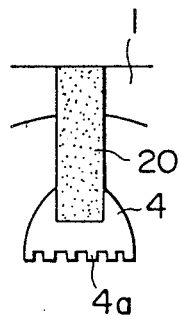 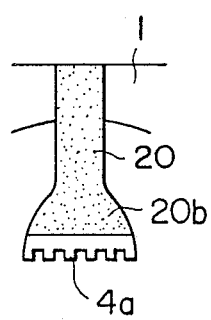

STEPPING MOTOR

BACKGROUND OF THE INVENTION

1. Field of the Invention

This invention relates to a stepping motor and, more particularly to a novel improvement therein in which a stator magnet is provided in the stator to increase the torque significantly without increasing the size of the rotor for the stator.

2. Prior Art

A variety of the above type of stepping motor have been employed in the art. FIGS. 1 to 4 show the construction of the stepping motor now being prepared in the company of the present Assignee and in which a stator disclosed in Japanese Patent Application KOKAI No. 254058/1986 is employed.

In these figures, a stator 1 having stator coils 1A in its yokes 4 is provided on its forward and rear sides with a front cover 2 and a rear cover 3 such that the stator 1 is sandwiched between the front cover 2 and the rear cover 3.

The stator 1 is formed by a large number of laminated press-worked thin silicon steel plates. As shown in FIGS. 2 and 3, it is provided with a number of radially projecting stator yokes 4, the distal ends of which are formed with a number of small teeth 4a.

A rotor shaft 8 carrying a rotor 7 is carried for rotation by a bearing 5 provided in the front cover 2 and a bearing 6 provided in the rear cover 3. A sleeve 9 is interposed between the bearings 5, 6 and the rotor 7.

The rotor 7 is formed by a pair of rotor yokes 10, 10 each having a number of small teeth 10a and rotor magnets 11 provided between the rotor yokes 10.

In operation, when a drive signal is supplied to the stator coil 1A, the rotor performs a step-by-step rotation, under the magnetic interaction between the stator yokes 4 and the rotor 7, with a predetermined angle of step-by-step rotation corresponding to the number of stator poles.

In the above described prior-art stepping motors, inasmuch as the stator is formed by a large number of laminated silicon steel plates, the magnetic fluxes emanating from the rotor are distributed among the small teeth of the stator, such that the stator yokes associated with the rotor magnets are supplied with magnetic fluxes emanating from the portions facing the small teeth of the rotor. It is therefore extremely difficult or even impossible with the above described prior-art stepping motor to develop a larger effective motor torque without altering the shape of the stator or the rotor.

SUMMARY OF THE INVENTION

It is therefore a principal object of the present invention to overcome the above inconveniences of the prior art and to provide a stepping motor wherein the torque developed by the motor may be increased significantly by providing stator magnets in the stator without increasing the size of the stator or the rotor.

In accordance with the present invention, there is provided a stepping motor comprising a stator provided with stator coils and sandwiched between covers, a rotor shaft mounted on said covers for rotation and carrying a rotor composed of rotor yokes and rotor magnets spaced from said stator by a gap, said rotor being rotated stepwise through a predetermined angle when drive signals are supplied to said stator coils, wherein said stator has stator magnets provided at an axially central position for cooperation with said rotor magnets, and wherein the magnetic flux density in said gap between the stator and the rotor is increased by said stator magnets.

In the stepping motor of the present invention, the stator magnets are provided in a clamped condition in the stator centrally located sandwiched between the stator laminations so that the amount of magnetic fluxes flowing between the rotor and the stator is increased and hence the torque is increased owing to the increased magnetic flux density in the gap by a factor of approximately 1.5 as compared with a conventional stepping motor of the same size. That is, since stator magnets are provided in the stator, magnetic fluxes produced by the stator magnets are added to the magnetic fluxes produced as conventionally by the rotor magnets and the stator coils, so that the magnetic flux density in each air gap is increased for increasing the torque developed by the motor.

Hence, a large torque may be developed by a small sized stepping motor without increasing the size of the motor to meet the demand for a larger torque and a lesser motor size to contribute to the reduction in size of a variety of electronic equipment.

BRIEF DESCRIPTION OF THE DRAWINGS

FIGS. 1 to 4 illustrate a stepping motor according to the prior art, in which

FIG. 1 is a sectional view of the stator,

FIG. 2 is a front view of the stator,

FIG. 3 is an enlarged view showing a portion of FIG. 2,

FIG. 4 is a partial sectional view for illustrating the flow of magnetic fluxes, FIGS. 5 to 9 illustrate the stepping motor according to the present invention, in which FIG. 5 is a sectional view showing the general arrangement of the stepping motor, FIG. 6 is a partial sectional view for illustrating the flow of magnetic fluxes, FIGS. 7 to 9 are diagrammatic views showing different embodiments of the stator magnets.

DESCRIPTION OF PREFERRED EMBODIMENT

Figure 1:
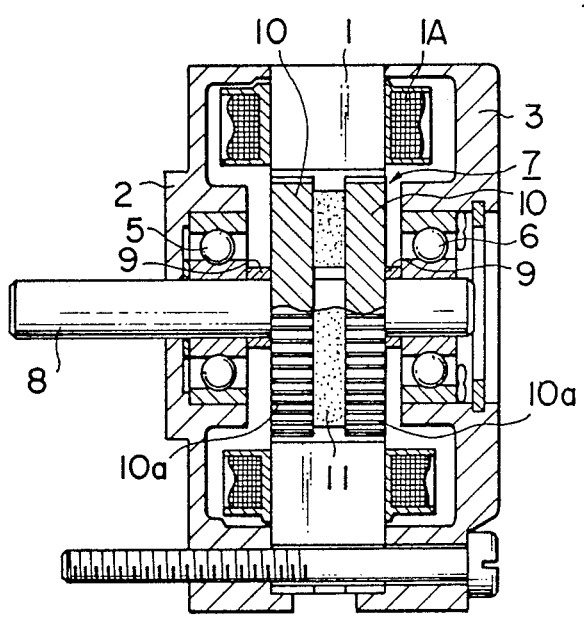

By referring to the drawings, an illustrative embodiment of the present invention will be explained in detail.

Figure 5:
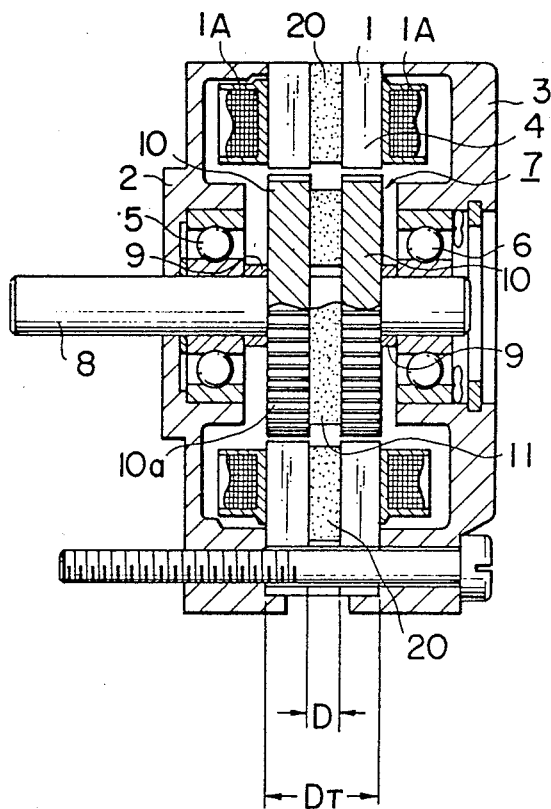

FIGS. 5 to 9 illustrate a stepping motor of the present invention. FIG. 5 is a sectional view showing the overall construction, FIG. 6 is a partial view showing the path of magnetic fluxes in the essential portions, FIG. 7 is a partial view showing a stator magnet and FIGS. 8 and 9 are partial views similar to FIG. 7 and showing modifications. In these figures, the same numerals are used to depict the same or equivalent parts.

In FIG. 5, a stator 1 having stator coils 1A is provided on opposite sides with a front cover 2 and a rear cover 3 such that the stator 1 is sandwiched between the front cover 2 and the rear cover 3.

The stator 1 is made from a magnetic material and formed by a large number of laminated press-worked thin silicon steel plates. Similar to the construction of the prior-art motor shown in FIG. 2, the stator 1 is provided with a number of radially projecting stator yokes 4, the distal ends of which are formed with a number of small teeth 4a.

At the central position in the axial direction or laminating direction of the stator 1 and at the position in register with rotor magnets as later described, stator magnets 20 are mounted in the sandwiched condition. Each stator magnet 20 has a thickness D of, for example, about 2 mm, accounting for about 20% of the total thickness $D_T$ of the stator 1 which is of the order of 10 to 12 mm.

Figure 2:
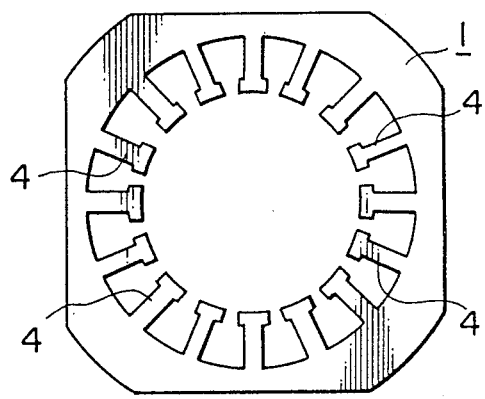
Figure 3:
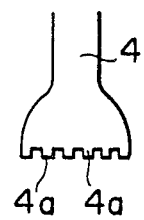

Each stator magnet 20 has a general configuration similar to that of the stator 1 shown in FIG. 2 and is provided with an annular connecting portion 20a. In an embodiment shown in FIG. 7, a number of stator magnets 20 equal to the number of stator yokes are formed as one with the annular connecting portion 20a. In a modification shown in FIG. 8, a number of stator magnets 20 in the form of tongues equal to the number of magnetic poles are formed separately and affixed to the annular connecting portion in association with the stator yokes 4 of the stator 1. In a further modification shown in FIG. 8, the lower ends of the stator magnets 20 in the form of tongues are provided with enlarged portions 20b to conform to the shape of the stator yokes 4 in the form of an inverted letter T for separate attachment to the stator yokes 4.

A rotor shaft 8 having a rotor 7 is carried for rotation by a bearing 5 provided in the front cover 2 and a bearing 6 provided in the rear cover 3. A sleeve 9 is interposed between the bearings 5, 6 and the rotor 7.

The rotor 7 is formed by a pair of rotor yokes 10, 10 each having a number of small projections 10a and rotor magnets 11 provided between the rotor yokes 10.

In operation, drive pulses are supplied sequentially to the stator coils 1A associated with magnetic pole pieces, so that, under the well-known magnetic interaction between the stator yokes 4 and the rotor 7, step-by-step rotation of the rotor is produced, each at a predetermined angle related to the number of the poles of the stator 1. In the case of eight and sixteen station poles, stepwise rotations by 1.8° and 0.9° are produced, respectively.

The mechanism of increasing the torque by the adoption of the stator magnet 20 is hereinafter explained.

Figure 4:
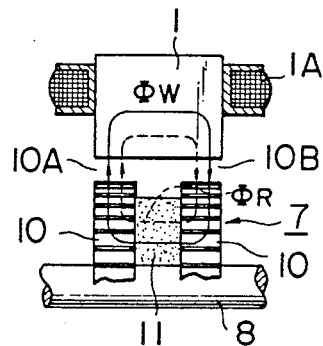

FIG. 6 shows a partial stator structure corresponding to one stator pole according to the present invention and FIG. 4 shows a partial stator structure corresponding to one stator pole according to the prior art. Referring to FIG. 4, the magnetic fluxes $\phi_R$ from the rotor magnet 11 flow along a loop shown by a broken line. The magnetic fluxes $\phi_R$ flow through the air gaps 10A and 10B between the rotor 10 and the stator 1.

The magnetic fluxes $\phi_W$ generated by the stator coil 1A wound about the stator 1 also flow through the air gaps 10A and 10B as indicated by the solid line. Thus the magnetic fluxes $(\phi_R + \phi_W)$ flow through the air gaps 10A or 10B and the torque corresponding to these magnetic fluxes is generated.

However, the stator magnet 20 is provided in the stator 1 of the present invention shown in FIG. 6, so that, in addition to the magnetic fluxes $\phi_R$ and $\phi_W$, the magnetic fluxes $\phi_S$ produced by the stator magnet 20 also act on the air gaps 10A and 10B. Thus the total magnetic fluxes of $(\phi_R + \phi_W + \phi_S)$ act on the air gaps 10A and 10B, which means that the magnetic fluxes are increased by $\phi_S$ as compared to the conventional stator structure. Our experiments have revealed that a torque about 1.5 times that developed by the prior-art motor can be developed by the present motor.

It has been confirmed that any type of magnet known in the art, such as a rubber magnet containing magnetic powders of rare earths, ferrite or neodymium or a conventional molded magnet, may be employed as the stator magnet 20 of the present invention.

What is claimed is:

1. A stepping motor comprising a stator provided with stator coils mounted on stator yokes with the stator sandwiched between covers, a rotor shaft mounted on said covers for rotation and carrying a rotor composed of rotor yokes and rotor magnets spaced from said stator by a gap, said rotor being rotated stepwise through a predetermined angle when drive signals are supplied to said stator coils, wherein said stator has stator magnets provided at an axially central position between two parts of said stator which stator magnets are polarized in the axial direction of the stator for cooperation with said rotor magnets, and wherein the magnetic flux density in said gap between the stator and the rotor is increased by said stator magnets.

2. The stepping motor according to claim 1 wherein said stator magnets are formed integrally with the stator projecting radially inwardly in register with said stator yokes.

3. The stepping motor according to claim 1 wherein said stator magnets are separate from said stator yokes and equal in number to said stator yokes.

4. The stepping motor according to claim 3 wherein one end of each of said stator magnets is formed integrally with an enlarged portion associated with the stator yoke.

5. The stepping motor according to claim 1 wherein said each stator magnet is a rubber magnet.

6. The stepping motor according to claim 2 wherein each said stator magnet is a rubber magnet.

7. The stepping motor according to claim 3 wherein each said stator magnet is a rubber magnet.

8. A stepping motor comprising a stator provided with stator coils mounted on stator yokes with the stator sandwiched between covers, a rotor shaft mounted on said covers for rotation and carrying a rotor composed of rotor yokes and rotor magnets spaced from said stator by a gap, said rotor being rotated stepwise through a predetermined angle when drive signals are supplied to said stator coils, wherein said stator has stator magnets provided at an axially central position for cooperation with said rotor magnets, said stator magnets being separate from said stator yokes, equal in number to said stator yokes, and with one end of each of said stator magnets formed with an enlarged integral portion associated with a corresponding stator yoke, whereby the magnetic flux density in said gap between the stator and the rotor is increased by said stator magnets.

* * * * *